US012627236B2

(12) United States Patent
Medina-Garcia

(10) Patent No.: US 12,627,236 B2
(45) Date of Patent: May 12, 2026

(54) CONTROLLER FOR AN ASYMMETRIC HALF BRIDGE FLYBACK CONVERTER, ASYMMETRIC HALF BRIDGE FLYBACK CONVERTER AND A METHOD OF CONTROLLING AN ASYMMETRIC HALF BRIDGE FLYBACK CONVERTER

(71) Applicant: Infineon Technologies Austria AG, Villach (AT)

(72) Inventor: Alfredo Medina-Garcia, Munich (DE)

(73) Assignee: Infineon Technologies Austria AG, Villach (AT)

( * ) Notice: Subject to any disclaimer, the term of this patent is extended or adjusted under 35 U.S.C. 154(b) by 304 days.

(21) Appl. No.: 18/125,413

(22) Filed: Mar. 23, 2023

(65) Prior Publication Data

US 2023/0318463 A1 Oct. 5, 2023

(30) Foreign Application Priority Data

Apr. 4, 2022 (EP) ..................................... 22166456

(51) Int. Cl.
 *H02M 3/335* (2006.01)
 *H02M 1/32* (2007.01)
 *H02M 3/00* (2006.01)

(52) U.S. Cl.
 CPC ......... *H02M 3/33569* (2013.01); *H02M 1/32* (2013.01); *H02M 3/01* (2021.05)

(58) Field of Classification Search
 CPC .......... H02M 3/01; H02M 3/015; H02M 3/22; H02M 3/24; H02M 3/28; H02M 3/315; H02M 3/3155; H02M 3/335; H02M 3/33507; H02M 3/33515; H02M 3/33523;

H02M 3/3353; H02M 3/33538; H02M 3/33546; H02M 3/33553; H02M 3/33569; H02M 3/33571; H02M 3/33573; H02M 1/0003; H02M 1/0009; H02M 1/0038; H02M 1/32; H02M 1/325; H02M 1/36; H02M 1/083; H02M 1/088; Y02B 70/10
 USPC ..... 363/15–21.18, 40–43, 50–58, 89, 95–98, 363/106, 109, 123, 131–134; 323/266, 323/271–278, 282–287, 351, 908; 361/78, 79, 83, 86, 87, 93.1–102
 See application file for complete search history.

(56) References Cited

U.S. PATENT DOCUMENTS

| | | | | |
|---|---|---|---|---|
| 7,567,070 | B2 * | 7/2009 | Djenguerian | ..... H02M 3/33507 323/284 |
| 9,837,898 | B2 * | 12/2017 | Deng | .................... H02M 3/157 |
| 10,170,974 | B1 * | 1/2019 | Oh | ......................... H02M 1/32 |
| 10,720,846 | B2 | 7/2020 | Feng et al. | |

(Continued)

OTHER PUBLICATIONS

Extended Search Report, EP 22 16 6456, Sep. 20, 2022, pp. 1-9.

(Continued)

*Primary Examiner* — Thienvu V Tran
*Assistant Examiner* — Carlos O Rivera-Perez
(74) *Attorney, Agent, or Firm* — Armis IP Law, LLC

(57) ABSTRACT

A controller for an asymmetric half bridge flyback converter as discussed herein. The control may include control logic configured to control one of a high-side switch and low-side switch of a half bridge of the asymmetric half bridge flyback converter based on a peak current control. For example, the control logic can be configured to limit an on-time of the one of the high-side switch and the low-side switch based on a threshold value.

12 Claims, 4 Drawing Sheets

(56)          References Cited

U.S. PATENT DOCUMENTS

| 2007/0114950 | A1 * | 5/2007 | Matsumura | ............ H05B 41/32 |
| | | | | 315/274 |
| 2016/0336847 | A1 | 11/2016 | Kim et al. | |

OTHER PUBLICATIONS

Medina-Garcia Alfredo et al: "Advanced Control Methods for Asymmetrical Half-Bridge Flyback", IEEE Transactions on Power Electronics, Institute of Electrical and Electronics Engineers, USA, vol. 36, No. 11, May 3, 2021 (May 3, 2021), pp. 13139-13148, XP011868947.

* cited by examiner

CONTROLLER FOR AN ASYMMETRIC HALF BRIDGE FLYBACK CONVERTER, ASYMMETRIC HALF BRIDGE FLYBACK CONVERTER AND A METHOD OF CONTROLLING AN ASYMMETRIC HALF BRIDGE FLYBACK CONVERTER

RELATED APPLICATION

This application claims priority to earlier filed European Patent Application Serial Number EP22166456 entitled "CONTROLLER FOR AN ASYMMETRIC HALF BRIDGE FLYBACK CONVERTER, ASYMMETRIC HALF BRIDGE FLYBACK CONVERTER AND A METHOD OF CONTROLLING AN ASYMMETRIC HALF BRIDGE FLYBACK CONVERTER," filed on Apr. 4, 2022, the entire teachings of which are incorporated herein by this reference.

BACKGROUND

Flyback converters are a type of voltage converters which provide galvanic isolation between an input and any output. A specific type of flyback converter is an asymmetric half bridge flyback converter, also sometimes referred to as asymmetric pulse-width modulation (PWM) half bridge flyback converter, also referred to as AHB flyback converter herein. An AHB flyback converter is essentially a converter with an inductor of the converter being split to form a transformer, such that voltage ratios are multiplied based on a winding ratio of the transformer with an additional advantage of isolation.

Such a flyback converter includes a half bridge circuit (i.e., half bridge) comprising a high-side switch and a low-side switch. One of the high-side switch and low-side switch is coupled in parallel to what is sometimes referred to as resonant tank, the resonant tank including at least stray inductances of the transformer and a resonant capacitor, and sometimes an additional inductor. The high-side switch and the low-side switch are alternatingly switched on and off. In a first phase the switch of the half bridge not coupled in parallel to the resonant tank is switched on, and energy is transferred from an input voltage source to the resonant tank. Then, in a second phase when the switch parallel to the resonant tank is switched on and the other switch of the half bridge is switched on, energy is transferred to a secondary side of the transformer to provide an output voltage. A switching cycle consists of a first phase powered by a second phase. After a switching cycle, the next switching cycle starts again, with a first phase and a second phase.

The above-mentioned first phase, where energy is transferred to the resonant tank, also referred to as charge phase, is usually controlled based on a peak current control scheme. In such a scheme, the current for the resonant tank is monitored, and when a peak is reached or a threshold current is reached, the switch which is not parallel to the resonant tank is switched off. However, under some conditions like specific loads, load changes or the like it may happen that a predefined peak voltage is not reached or reached very late which may lead to high voltages across a capacitor of the resonant tank. This may for example lead to too high voltages present in the converter.

BRIEF DESCRIPTION

According to an embodiment, a controller for an asymmetric half bridge flyback converter is provided, comprising:

a control logic configured to control one of a high-side switch and low-side switch of a half bridge of the flyback converter based on a peak current control scheme (i.e., peak current control function), and further configured to limit an on-time of the one of the high-side switch and the low-side switch based on a threshold value.

According to a further embodiment, an asymmetric half bridge flyback converter is provided, comprising the controller as defined above, a half bridge comprising the high-side switch and the low-side switch, and a resonant circuit including a capacitor and a primary winding of a transformer coupled in parallel to the other one of the high-side switch and the low-side switch.

According to a further embodiment, a method for controlling an asymmetric half bridge flyback converter is provided, comprising:

controlling one of a high-side switch and a low-side switch of a half bridge of the flyback converter based on a peak current control scheme, and further limiting an on-time of the one of the high-side switch and the low-side switch based on a threshold value.

DETAILED DESCRIPTION

Figure 1:
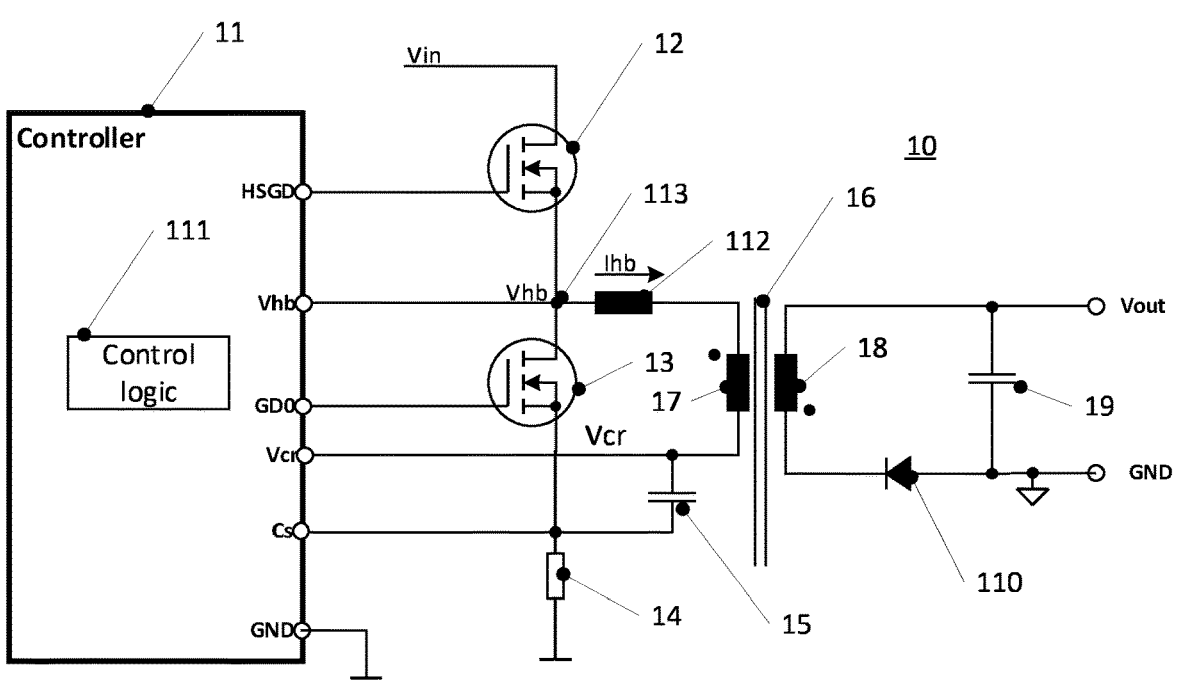
FIG. 1 is a circuit diagram of a flyback converter according to an embodiment.

In the following, various embodiments will be described in detail referring to the attached drawings. These embodiments are given as examples only and are not to be construed as limiting in any way. For example, while embodiments may be described as comprising a plurality of features (e.g. components, devices, elements, acts, events etc.), this is not to be construed as limiting, and in other embodiments, some of the features may be omitted, and/or may be replaced by alternative features. In addition to the features explicitly described, further features, for example features conventionally provided in flyback converters like asymmetric half bridge flyback converters, for example protection mechanisms or feedback controls, may be used. In other words, apart from specifics described herein, flyback converters may be implemented in a conventional manner, and such conventional features will not be described in greater detail.

Different embodiments may be combined with each other to form further embodiments unless noted otherwise. Variations and modifications described with respect to one of the embodiments may also be applicable to other embodiments.

Connections or couplings shown in the drawings or described herein refer to electrical connections or couplings unless noted otherwise. In the embodiments shown and described, any direct electrical connection or coupling between elements, i.e. connections or couplings without intervening elements, may be replaced by an indirect connection or coupling, i.e. a connection or coupling comprising one or more additional intervening element, and vice versa, as long as the general purpose of the connection or coupling, for example to provide a certain kind of signal, a certain kind of information or a certain kind of control, is essentially maintained. In other words, connections or couplings may be modified as long as the general purpose and function of the connection or coupling remains essentially unaltered.

Embodiments relate to asymmetric half bridge flyback converters, controllers for flyback converters and associated methods. Such flyback converters include a half bridge with a high-side switch and a low-side switch, and a resonant tank. A transformer couples a primary side of the converter to a secondary side. The high-side switch and the low-side switch are alternatingly closed and opened, to supply power to the resonant tank and then transfer the power to a secondary side, as will be further explained below. Switches may be implemented using transistors like field effect transistors, bipolar junction transistors or insulated gate bipolar transistors. Depending on the voltage requirements, transistors may include a plurality of transistor cells coupled in parallel or in series. In this respect, a switch is "on" or "closed" when it provides low ohmic connection between terminals thereof, and is "off" or "open" in a state where it provides essentially an electric isolation between the terminals (apart possibly from leakage currents).

Turning now to the Figures, FIG. 1 is a circuit diagram illustrating an asymmetric half bridge flyback converter 10 according to an embodiment. Flyback converter 10 of FIG. 1 comprises a controller 11 according to an embodiment configured to control a high-side switch 12 via an output HSGD and low-side switch 13 via an output GD0. High-side switch 12 and low-side switch 13 form a half bridge circuit (a.k.a., half bridge). A voltage Vhb at a node 113 between high-side switch 12 and low-side switch 13 may be received at a corresponding input Vhb of controller 11 for conventional control purposes. In the embodiment shown, high-side switch 11 and low-side switch 12 are NMOS transistors. However, in other embodiments, other types of transistors or other switch types may be used. High-side switch 12 and low-side switch 13 are coupled in series between a direct current (DC) input voltage Vin and a reference voltage, for example ground, as shown. Node 113 between high-side switch 12 and low-side switch 13 is coupled to a first end of a primary winding 17 of a transformer 16. Optionally, an additional inductor 112 may be coupled between node 113 and the first end of primary winding 17. A second end of primary winding 17 is coupled to ground via a resonant tank capacitor 15. Between ground, a terminal of capacitor 15 and low-side switch 13 a shunt resistor 14 is provided as shown. Via an input Cs of controller 11, using shunt resistor a current Ihb flowing via inductor 112 (if present), primary winding 17 and capacitor in a state where low-side switch 13 is switched off may be measured by controller 11. Instead of using a shunt resistor, also other conventional means for measuring the current may be employed, for example measurements based on a magnetic field sensor, measurements based on a signal from an auxiliary winding of transformer 16 etc. In some embodiments, additionally a voltage Vcr at capacitor 15 may be measured by controller 11 via an input Vcr. Furthermore, controller 11 includes a terminal GND coupled to ground as shown.

A leakage inductance of transformer 16, in particular of primary winding 17, capacitor 15 and, if present, additional inductor 112, form a LC resonator, also referred to as resonant tank herein.

Transformer 16 further comprises a secondary winding 18. As indicated by dots, primary winding 17 and secondary winding 18 have opposite winding directions, which is typical for asymmetric half bridge flyback converters. A first end of secondary winding 18 is coupled to an output voltage Vout. A ground terminal GND is coupled to a second end of secondary winding 18 via a rectifying diode 110. Furthermore, an output capacitor 19 is coupled between the output terminal and the ground terminal as shown, acting essentially as a filter.

Controller 11 includes a control logic 111, which controls high-side switch 12 and low-side switch 13 for example based on voltages Vhb, Vcr and the current Ihb measured using shunt resistor 14. Control logic 111 may be implemented in any conventional manner for example using an application specific integrated circuit, a programmed micro controller, or the like.

Generally, as in some conventional flyback converters the control may use a peak current control scheme (function), as will be explained in some more detail below. In addition, other conventional control schemes may be used. Furthermore, unlike conventional converters control logic 111 is configured to limit an on-time of high-side switch 12 based on a threshold value, as will also be discussed further below in more detail.

Figure 2:
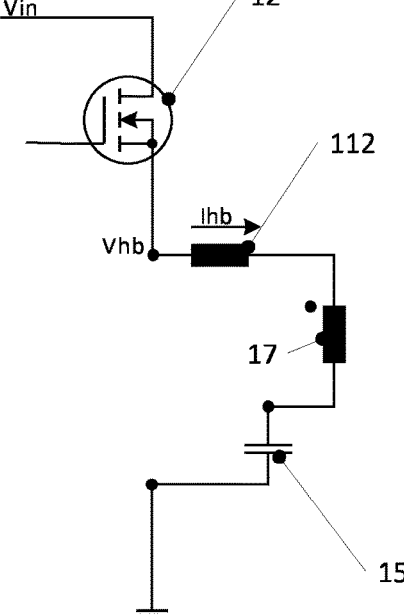
FIG. 2 illustrates part of the flyback converter of FIG. 1 for illustrating a charging phase.

Operation of the flyback converter 10 of FIG. 1 may generally be divided in two phases. In a first phase, also referred to as charging phase, high-side switch 12 is closed, thus connecting the input voltage Vin to the resonant tank, and low-side switch 13 is open. In this phase, energy is provided from the input voltage to the resonant tank. This phase is schematically shown in FIG. 2, where the path from the input voltage Vin via high-side switch 12 to the resonant tank including inductor 112, primary winding 17 and capacitor 15 and finally to ground is shown. In a second phase, then high-side switch 12 is opened and low-side switch 13 is closed (usually with a dead time in between to prevent an inadvertent short circuit). During this phase, also referred to as transfer phase, then energy stored in the resonant tank during the first phase is transferred to the secondary side via transformer 16.

Figure 3:
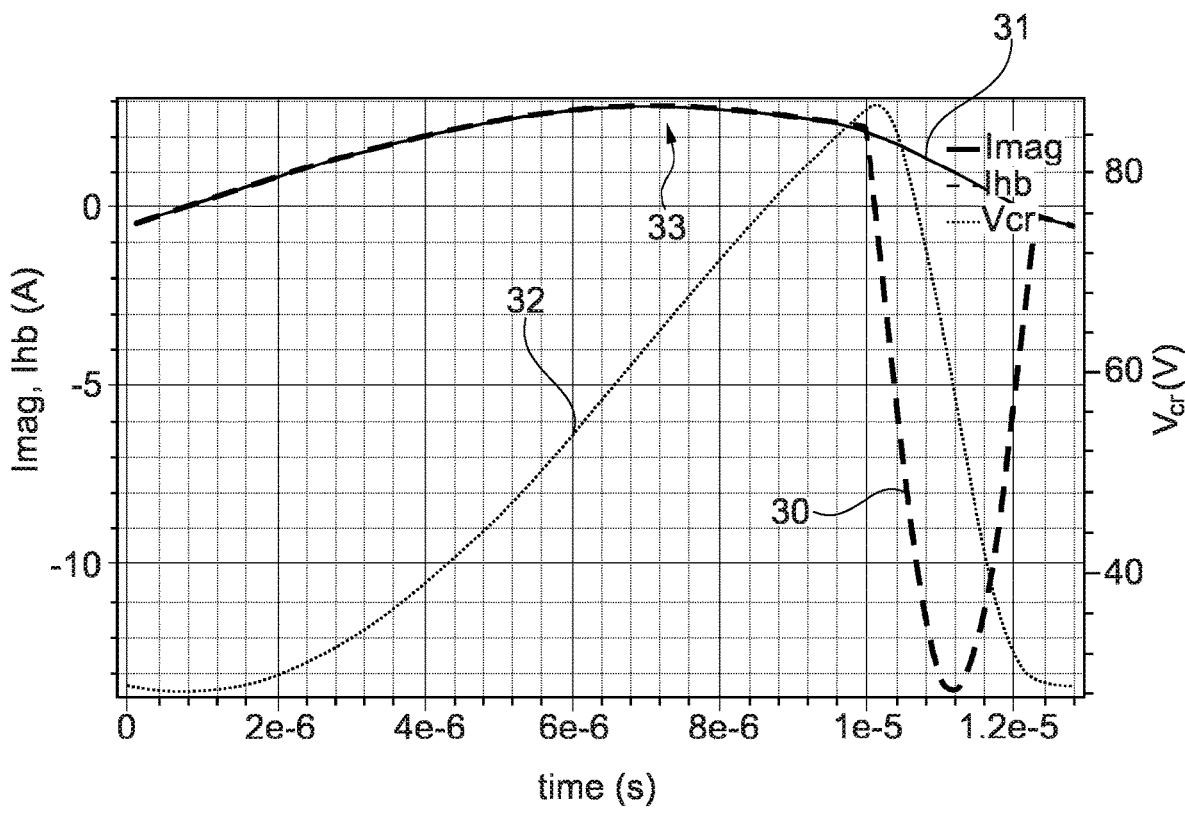
FIG. 3 illustrates voltages and currents in the flyback converter of FIG. 1.

The end of the first phase, is primarily determined by a peak current control scheme. For illustration, FIG. 3 shows various example signals in the embodiment of FIG. 1. Namely, a curve 30 shows the current Ihb, a curve 31 illustrates a magnetizing current Imag, which in the first phase coincides with the current Ihb, and a curve 32 illustrates a voltage Vcr at capacitor 15.

As can be seen, the current Ihb according to curve 30 first rises and then would decrease, until it then differs from the magnetizing current in the second phase. Conventionally, and also as a part of the control in embodiments discussed herein, a peak current control scheme (i.e., function) is used, where the current Ihb is monitored, for example via shunt resistor 14 in FIG. 1, until the current reaches a threshold which ideally corresponds with a peak of the current Ihb marked with an arrow 32 in FIG. 3.

When this peak current is reached, in FIG. 1 high-side switch 12 is switched off, and low-side switch 13 is switched on to enter the second phase.

However, as already mentioned in the background portion under some circumstances the peak current may not be reached, which for example, as can also be seen in FIG. 3, may lead to excessively high voltages at capacitor 15. Therefore, unlike conventional solutions an additional limitation mechanism for limiting the on-time of the high-side switch is employed in embodiments.

Figure 4:
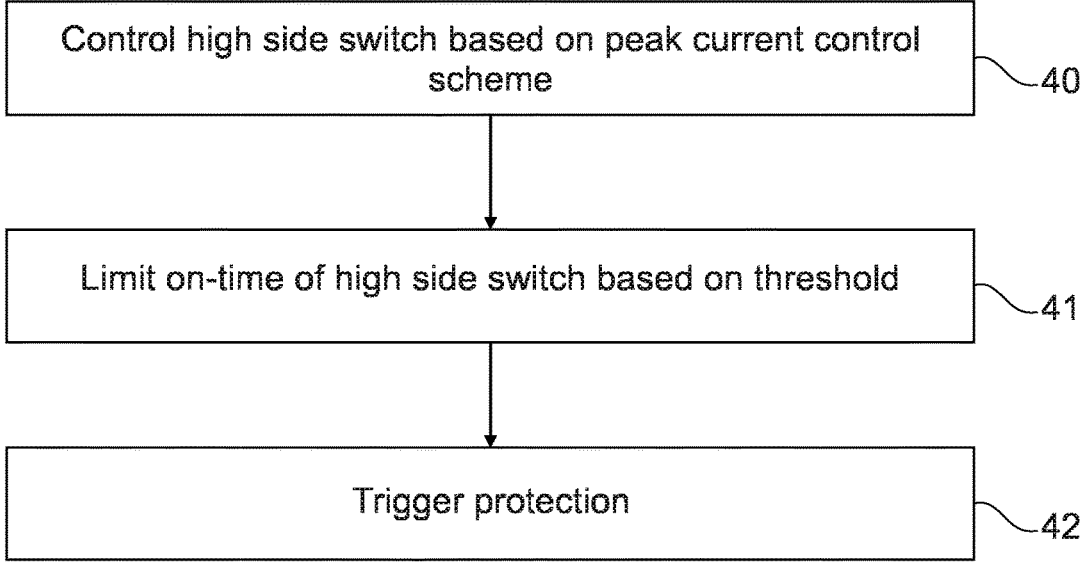
FIG. 4 is a flowchart illustrating a method according to an embodiment.

FIG. 4 is a flowchart generally illustrating methods according to embodiments. Details will then be discussed referring to FIGS. 5 and 6.

In the method of FIG. 4, at 40 a high-side switch of an asymmetric half bridge flyback converter as for example shown in FIG. 1 is controlled according to a peak current control scheme as discussed above, which may be implemented in any conventional manner. However, unlike conventional solutions at 41 the on-time of the high side switch is additionally limited based on a threshold value.

Different threshold values may be used. As will be explained below in more detail, in some embodiments the threshold may be a time threshold for the on-time, and when the time threshold is reached, the high-side switch is switched off. In some embodiments, the time threshold may depend on a previous on-time of the high side switch, in particular a previous on-time based on peak current control.

In some other implementations, the threshold may be a voltage threshold for the voltage Vcr at capacitor 15, and when a voltage threshold is exceeded the high-side switch may be switched off.

In both cases, optionally, if the limiting at 41 has been performed a plurality of times (e.g. if the limiting based on the threshold has to be performed a plurality of consecutive switching cycles of the converter), at 42 some protection mechanism may be triggered. For example, the converter may be switched off as a protection, or a signal indicating a problematic condition may be output, which then may be processed by further entities of a system including the flyback converter.

While now the method will be further explained in the following using example signals in FIGS. 5 and 6, it is to be noted that these signals are to be taken as schematic and depending on implementation, load, input voltage and other circumstances signal waveforms may vary. Therefore, the signal waveform shown are to be taken as simple examples.

An example for using a time threshold will now be explained with reference to FIG. 5. FIG. 5 illustrates various example signals in flyback converter 10 of FIG. 1. In a topmost row in FIG. 5, signals controlling high-side switch 12 and low-side switch 13 are schematically shown. During blocks 50 and 52, high-side switch 12 is closed and low-side switch 13 is open, and during blocks 51 and 53 low-side switch 13 is closed and high-side switch 12 is open. As can be seen short dead times are left in-between. A curve 57 shows the current Ihb, a curve 56 shows the magnetizing current Imag, the two coinciding during the on-time of the high-side switch in blocks 50, 52), and a curve 59 shows the voltage Vcr. A line 55 shows the threshold for peak current control.

Figures 5, 6:
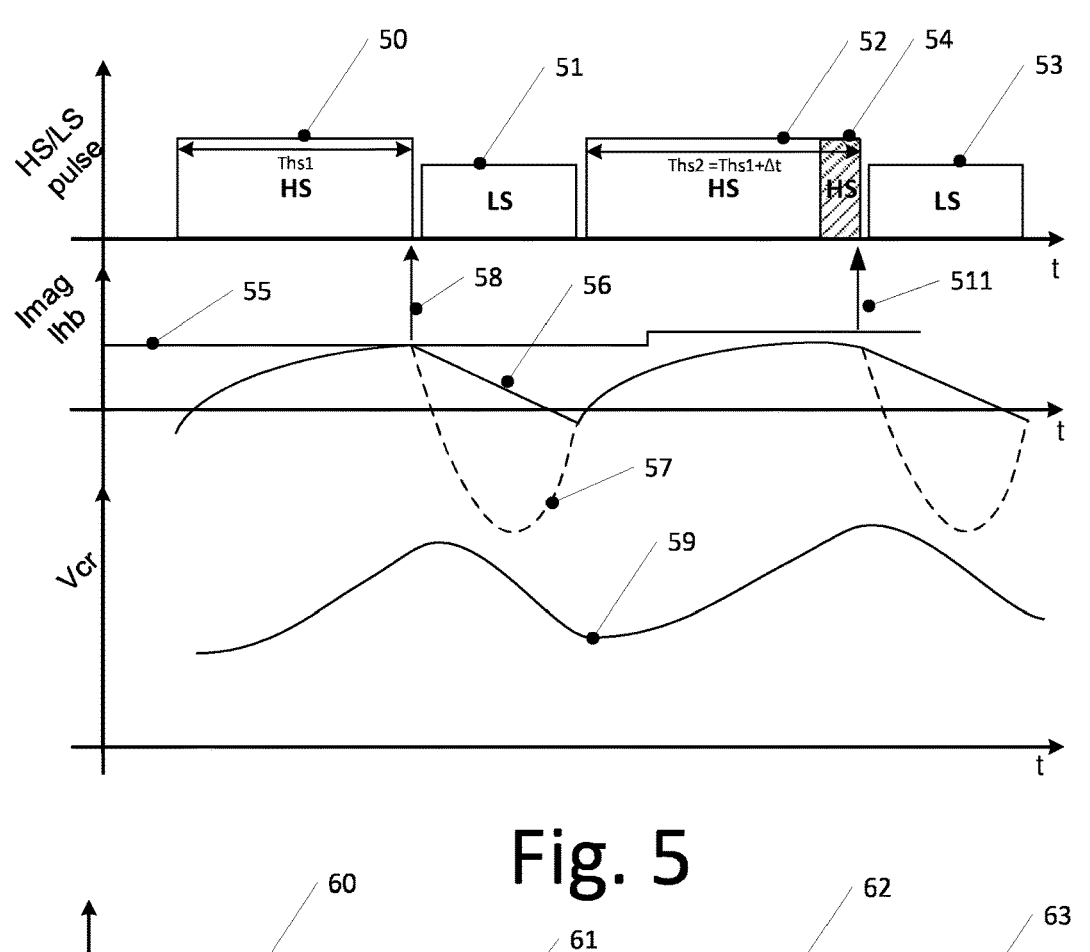
FIG. 5 is a signal diagram illustrating an implementation possibility of the method of FIG. 4.
FIG. 6 is a signal diagram illustrating another implementation possibility of the method of FIG. 4.

In a first switching cycle in FIG. 5, normal peak current control occurs. Here, when the current Ihb according to curve 57 reaches threshold 55, as indicated by arrow 58 the high-side switch is switched off, and then the second phase of the first switching cycle (low-side switch closed during block 51) starts. The time duration the high-side switch is switched on is denoted Ths1 in FIG. 5.

In the second switching cycle, however, the threshold represented by line 55 is not reached for some reason. In the example shown, for the threshold represented by line 55 increases. This may for example be due if the output voltage is to be increased and therefore a higher peak current is desired. Another case where the threshold is not reached may be when the threshold remains constant, but the input voltage of the flyback converter decreases for some reason. Here, instead a time limit is applied. In the specific embodiment of FIG. 5, the time limit corresponds to the time Ths1 of the previous switching cycle where the peak current control was performed, plus a predefined safety margin time ΔT. This time Ths2=Ths1+ΔT is reached at a point in time indicated by an arrow 511, at which time the high-side switch is switched off. The margin time ΔT is also illustrated by a part 54 of block 52 in FIG. 6.

While in the example of FIG. 5, the time Ths1 of the last previous switching cycle where peak current control was enacted, i.e. the peak current threshold was reached, is used as a basis for the time limit, and the time limit is then calculated by adding ΔT to this time, in other embodiments for example an average of on-times a predefined number of previous switching cycles where peak current control was enacted may be used, or in yet other embodiments a predefined time limit independent from previous switching cycles may be used. Therefore, the time limit of FIG. 5 is to be taken only as an example.

FIG. 6 illustrates example signals for a case whereas threshold a voltage threshold for the voltage Vcr is used. Generally, the situation in FIG. 6 corresponds to the situation in FIG. 5, and corresponding elements bear the same reference numerals with a leading 6 instead of a leading 5. Block 60, 62 illustrate time periods where the high-side switch 12 is closed and the low-side switch 13 is open, and blocks 61, 63 illustrate time periods where the low-side switch is closed and the high-side switch is open. A curve 66 denotes the magnetizing current, and a curve 67 denotes the current Ihb, which again coincide during the first phases (block 60 and 62). A curve 69 illustrates the voltage Vcr, and a curve 65 illustrates the threshold for peak current control.

As in the scenario of FIG. 5, in a first switching cycle (block 60 and 61), the threshold 65 is reached by the peak of current Ihb, and when the peak is reached as indicated by an arrow 68 the first phase is ended, i.e. high-side switch 12 is switched off. However, again similar to FIG. 5, in the second switching cycle (block 62 and 63) threshold 65 is not reached.

When the threshold is not reached and high-side switch 62 continues to be on, voltage Vcr as illustrated by curve 69 raises until a voltage threshold 610 is reached. As soon as this is the case, as indicated by an arrow 611 high-side switch 62 is switched off. Therefore, this constitutes another example for limiting the on-time of the high-side switch based on the threshold.

The controller tracks a number of times that the threshold is reached or crossed over time. In both the cases of FIGS. 5 and 6, if the limiting by the controller occurs a predetermined number of times (i.e. a count limit value specifying a predetermined number of times where the time limit of FIG. 5 is reached or the voltage threshold 610 of FIG. 6 is reached), additional protection as at 42 in FIG. 4 may be performed. The predetermined number (or count limit value) may be at least two, at least three or at least four, or any number. It should also be noted that the two approaches of FIGS. 5 and 6 may be combined, i.e. both the voltage Vcr may be monitored and a time threshold may be used, and if one of the two thresholds is reached the high-side switch is switched off.

Thus, a controller 11 (or control logic 111) as discussed herein is operative to: control a switch of a half bridge circuit disposed in a flyback converter, the switch controlled based on a peak current control function; via the peak current control function, produce a count value indicating a number of times of limiting an on-time of the switch with respect to a threshold value; and trigger a protection condition of controlling the switch in response to detecting that the count value crosses a count limit value.

Figure 7:
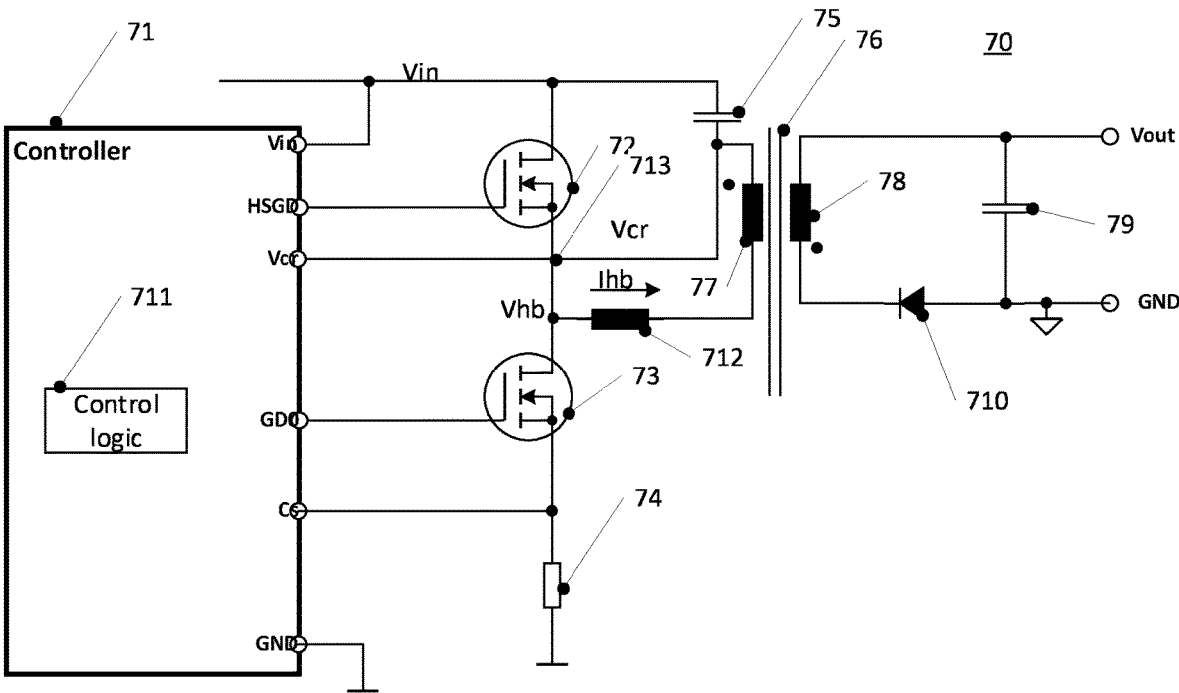
FIG. 7 illustrates a flyback converter according to another embodiment.

The control discussed above is adapted to the flyback converter 10 of FIG. 1, where low-side switch 13 is coupled in parallel to the resonant tank as shown, and high-side switch 12 selectively couples the resonant tank to the input voltage Vin. The techniques discussed above are also applicable to the reverse situation, i.e. an asymmetric half bridge flyback converter 70 as shown in FIG. 7. The flyback converter 70 of FIG. 7 includes a controller 71 having a control logic 711, a high-side switch 72, a low-side switch 73 with a node 713 in-between, a shunt resistor 74 for current measurements, a transformer 76 including a primary winding 77 and a secondary winding 78, a resonant tank capacitor 75, and an optional additional inductor 712. On a secondary side, a rectifying diode 710 and an output capacitor 79 is provided. Generally, apart from the differences as discussed below, elements of flyback converter 70 correspond to elements of flyback converter 10 of FIG. 1, and corresponding elements bear the same reference numerals, with the leading 1 replaced by a leading 7.

In contrast to flyback converter 10, in FIG. 7 high-side switch 72 is coupled in parallel to the resonant tank including capacitor 75, optional inductor 712 and stray inductances of transformer 76, and low-side switch 73 is coupled between the resonant tank and a voltage potential, in this case ground. Therefore, the roles of ground and the input voltage are reversed, and the roles of high-side switch 72 and low-side switch 73 are reversed. Correspondingly, the control performed by control logic 711 of controller 71 is also reversed: in a first phase, low-side switch 73 is closed to transfer energy to the resonant tank, and in a second phase low-side switch 73 is opened and high-side switch 72 is closed to transfer the energy to the secondary side.

Consequently, also the control discussed with reference to FIGS. 4 to 6 is reversed: In case of FIG. 7, primarily the on-time of the low-side switch (instead of the high-side switch) is controlled based on a peak current control scheme, and the on-time of low-side switch 73 may be additionally limited based on a threshold, for example a time threshold as discussed with reference to FIG. 5 or a voltage threshold of voltage Vcr at a capacitor 75 as discussed with reference to FIG. 6. Otherwise, the explanations given above may also be applied to the embodiment of FIG. 7, and will therefore not be repeated in detail.

Some embodiments are defined by the following examples:

Example 1. A controller for an asymmetric half bridge flyback converter, comprising:
a control logic configured to control one of a high-side switch and a low-side switch of a half bridge of the flyback converter based on a peak current control scheme, and
further configured to limit an on-time of the one of the high-side switch and the low-side switch based on a threshold value.

Example 2. The controller of example 1, wherein the other one of the high-side switch and the low side switch of the half bridge is coupled in parallel to a resonant circuit of the flyback converter.

Example 3. The controller of example 1 or 2, wherein the peak current control scheme comprises switching off the one of the high-side switch and the low-side switch when a current provided via the one of the high-side switch and the low-side switch reaches a peak value or a threshold value.

Example 4. The controller of any one of examples 1 to 3, wherein the threshold value comprises a time threshold value, and wherein the control logic is configured to switch off the one of the high-side switch and low-side switch when the on-time of the one of the high-side switch and the low-side switch exceeds the threshold value.

Example 5. The controller of example 4, wherein the control logic is configured to determine the time threshold value based on an on-time of the one of the high-side switch and low-side switch in at least one previous switching cycle where the on-time was limited based on the peak current controls scheme.

Example 6. The controller of example 5, wherein the control logic is configured to determine the time threshold value based on the on-time in the at least one previous switching cycle plus a predefined time margin value.

Example 7. The controller of any one of examples 1 to 6, wherein the threshold value comprises a voltage threshold value for a voltage at a resonant tank capacitor of the flyback converter.

Example 8. The controller of any one of examples 1 to 7, wherein the control logic is configured to trigger a protection mechanism if the on-time of one of the high-side switch and the low-side switch has been limited based on the threshold value for a predetermined number of times.

Example 9. An asymmetric half bridge flyback converter, comprising:
the controller of any one of examples 1 to 8, a half bridge comprising the high-side switch and the low-side switch, and
a resonant circuit including a capacitor, and a primary winding of a transformer and coupled in parallel to the other one of the high-side switch and the low-side switch.

Example 10. A method for controlling an asymmetric half bridge flyback converter, comprising:
controlling one of a high-side switch and a low-side switch of a half bridge of the flyback converter based on a peak current control scheme, and
limiting an on-time of the one of the high-side switch and the low-side switch based on a threshold value.

Example 11. The method of example 10, wherein the other one of the high-side switch and the low side switch of the half bridge is coupled in parallel to a resonant circuit of the flyback converter.

Example 12. The method of example 10 or 11, wherein the peak current control scheme comprises switching off the one of the high-side switch and the low-side switch when a current provided via the one of the high-side switch and the low-side switch reaches a peak value or a threshold value.

Example 13. The method of any one of examples 10 to 12, wherein the threshold value comprises a time threshold value, and wherein limiting the on-time comprises switching off the one of the high-side switch and low-side switch when the on-time of the one of the high-side switch and the low-side switch exceeds the threshold value.

Example 14. The method of example 13, further comprising determining the time threshold value based on an on-time of the one of the high-side switch and low-side switch in at least one previous switching cycle where the on-time was limited based on the peak current controls scheme.

Example 15. The method of example 14, wherein determining the time threshold value comprises determining the time threshold value based on the on-time in the at least one previous switching cycle plus a predefined time margin value.

Example 16. The method of any one of examples 10 to 15, wherein the threshold value comprises a voltage threshold value for a voltage at a resonant tank capacitor of the flyback converter.

Example 17. The method of any one of examples 10 to 16, further comprising triggering a protection mechanism if the on-time of one of the high-side switch and the low-side switch has been limited based on the threshold value for a predetermined number of times.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A controller operative to control a high-side switch and a low-side switch of a half bridge circuit of a flyback converter, the flyback converter operative to convert an input voltage into an output voltage, the controller comprising:

control logic operative to:

control one of the high-side switch and the low-side switch of the half bridge circuit of the flyback converter based on a peak current control function;

for each of multiple switching cycles of controlling the high-side switch and the low-side switch, via the peak current control function, limit an on-time of the one of the high-side switch and the low-side switch based on a first threshold value; and trigger a protection mechanism when the on-time of one of the high-side switch and the low-side switch has been limited based on the first threshold value for a predetermined number of times, the predetermined number of times being greater than one;

wherein the first threshold value is a time threshold value, and wherein the control logic is configured to switch off the one of the high-side switch and low-side switch during a condition in which the on-time of the one of the high-side switch and the low-side switch exceeds the time threshold value:

wherein the control logic is configured to determine the time threshold value based on an on-time of the one of the high-side switch and the low-side switch in a first switching cycle during which the on-time in the first switching cycle was limited based on the peak current control function; and wherein the control logic is configured to determine the time threshold value based on the on-time in the first switching cycle plus a predefined time margin value.

2. The controller of claim 1, wherein the other one of the high-side switch and the low side switch of the half bridge circuit is coupled in parallel to a resonant circuit of the flyback converter.

3. The controller of claim 1, wherein the peak current control function comprises switching off the one of the high-side switch and the low-side switch during a condition in which a current provided via the one of the high-side switch and the low-side switch reaches a second threshold value.

4. The controller of claim 1, wherein the first threshold value is a voltage threshold value for a voltage at a resonant tank capacitor of the flyback converter.

5. The controller of claim 1, wherein the predetermined number of times is at least two.

6. An asymmetric half bridge flyback converter, comprising:

the controller of claim 1, the half bridge circuit comprising the high-side switch and the low-side switch, and a resonant circuit including a capacitor and a primary winding of a transformer and coupled in parallel to the other one of the high-side switch and the low-side switch.

7. An apparatus comprising:

a controller in communication with a flyback converter, the flyback converter operative to convert an input voltage into an output voltage, the controller operative to:

control a switch in a half bridge circuit of the flyback converter over multiple switching cycles, the switch operative to control a magnitude of current through a primary winding of a transformer of the flyback converter, a secondary winding of the transformer operative to produce the output voltage, the switch controlled based on a peak current control function;

produce a count value indicating a number of times of limiting an on-time of the switch with respect to a threshold value via the peak current control function; and trigger a protection condition of controlling the switch in response to detecting that the count value indicating the number of times of limiting the on-time of the switch via the peak current control function crosses a count limit value;

wherein the threshold value is a time threshold value derived from control of the switch in a first switching cycle of the multiple switching cycles:

wherein the controller is operative to generate the count value to indicate multiple instances of the on-time of the switch exceeding the threshold value in a portion of the multiple switching cycles occurring later in time than the first switching cycle;

wherein the time threshold value is a first threshold value;

wherein the controller is further operative to: generate the time threshold value based on a first time duration measured between activation of the switch at a first instant of time and deactivation of the switch at a second instant of time in the first switching cycle; and wherein the controller is further operative to: determine the second instant of time based on detection that the magnitude of the current through the primary winding of the flyback converter crosses a second threshold; and set the magnitude of the time threshold value to be the first time duration plus a predefined delta time value.

8. The apparatus as in claim 7, wherein the controller is operative to:

compare the magnitude of the current through the primary winding for each respective switching cycle in the portion of multiple switching cycles following the first switching cycle; and increment the magnitude of the count value for the respective switching cycle in response to detecting that the switch is activated to the on state for at least the time threshold value in the respective switching cycle without the magnitude of the current through the primary winding being detected as greater than the second threshold value.

9. The apparatus as in claim 8, wherein a magnitude of the second threshold varies over time.

10. The apparatus as in claim 7, wherein the flyback converter includes a capacitor disposed in series with the primary winding via a circuit node, a combination of the primary winding and the capacitor being a resonant tank circuit;

wherein the threshold value is a threshold voltage value; and wherein the controller is operative to generate the count value to indicate multiple instances of a magnitude of a voltage at the circuit node being detected as exceeding the threshold voltage value in each respective switching cycle of a portion of the multiple switching cycles occurring later in time than the first switching cycle.

11. The apparatus as in claim 10, wherein the controller is operative to:

compare the magnitude of the voltage at the circuit node to the threshold voltage value for each respective switching cycle in the portion of multiple switching cycles following the first switching cycle; and for each respective switching cycle, increment the magnitude of the count value in response to detecting that the magnitude of the voltage at the circuit node in the respective switching cycle crosses the threshold voltage value.

12. The apparatus as in claim 11, wherein a magnitude of the threshold voltage value is fixed over time.

\*    \*    \*    \*    \*